Oct. 11, 1927.
B. OKNER
BALL BEARING
Filed Dec. 9, 1926
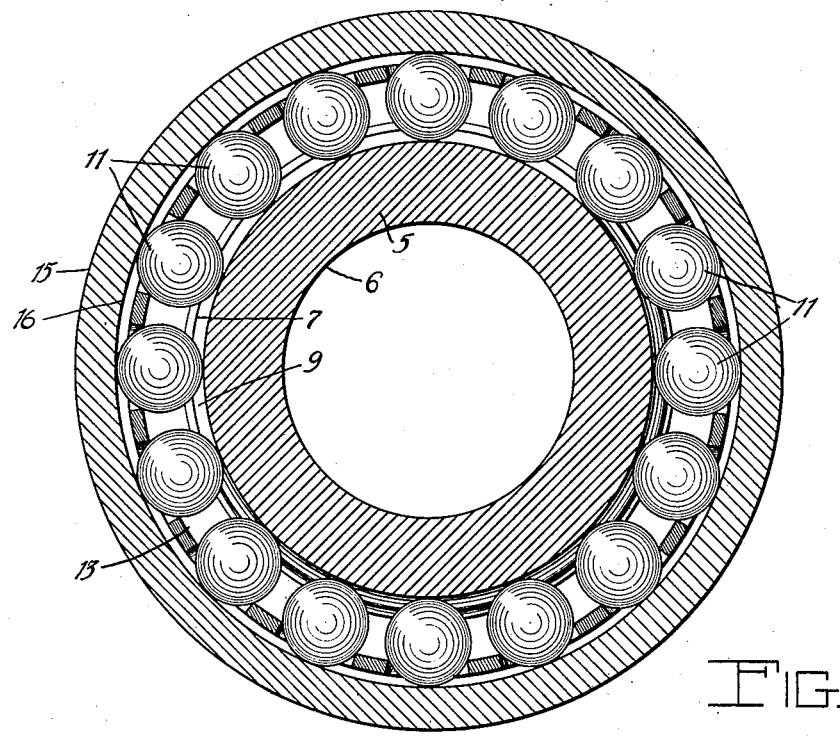
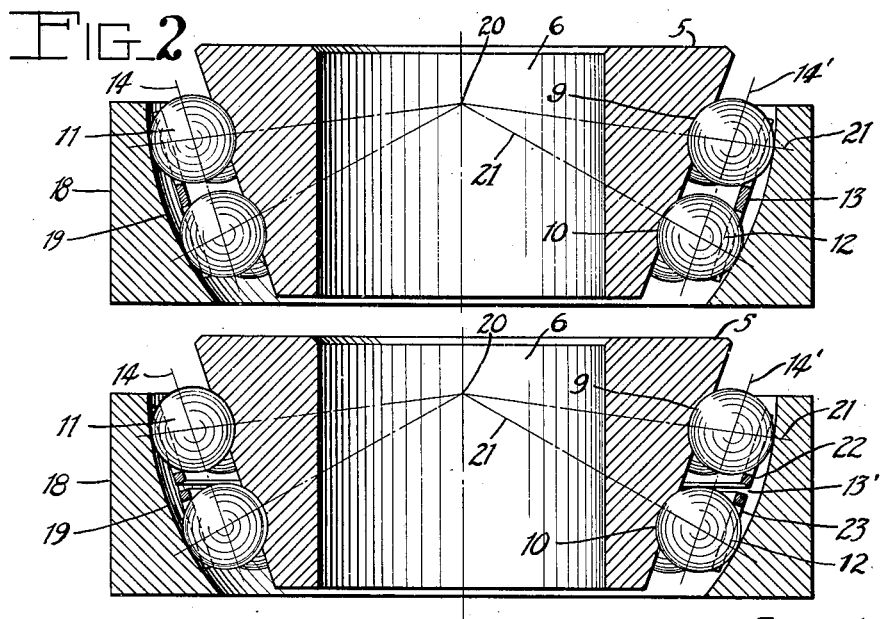
Inventor
Bernard Okner
By Daniel Brennan.
Atty.

Patented Oct. 11, 1927.

1,645,345

UNITED STATES PATENT OFFICE.

BERNARD OKNER, OF CHICAGO, ILLINOIS.

BALL BEARING.

Continuation in part of application Serial No. 547,879, filed March 29, 1922. This application filed December 9, 1926. Serial No. 153,572.

This invention relates to anti-friction bearings, and more particularly pertains to new and useful improvements in ball bearings and the like.

The principal objects and advantages which characterize this invention reside in: the provision of an improved bearing which by the employment of one species of anti-friction element affords a bearing which withstands both radial and end thrust; the provision of an improved disposition of the anti-friction elements in a bearing of the character referred to; the provision of an improved arrangement of the anti-friction elements wherein pressure is equally distributed upon all of the anti-friction elements for preventing uneven wearing, disalinement, or tilting of the parts of the bearing; the provision of an improved construction of bearing wherein the anti-friction elements are all disposed in the same general plane with respect to a single bearing surface to insure even distribution of pressure, both radial and endwise, on all the anti-friction elements; the provision of a bearing of the character referred to wherein the plane of the axes of the bearing elements is disposed at an inclination to the axis about which the bearing elements revolve; the provision of a device of the character described wherein the structure is simplified and cost of production reduced, and wherein assembly of the parts may be quickly and easily accomplished.

This invention takes a mechanical form to be described later, wherein the use of balls for anti-friction purposes is permitted, one of the more important objects and features of this invention being to permit the use of balls rather than rollers, for two reasons, first: the rollers cost more, and, secondly, in a bearing adapted to take up end thrust as well as radial pressure, the rollers must be manufactured a special shape, usually tapering, which further adds to the cost, without in fact, giving entire efficiency in operation. Therefore, I have provided an improved arrangement of the bearing races whereby efficient results are attained by the use of ordinary steel balls. The arrangement is such that the balls, there being at least two series of same, are disposed in a bearing wherein the cone and cup are provided with spaced bearing surfaces which are at an inclination to the axis of the bearing, the pair of series of balls being disposed between and in equal contact with said surfaces, thereby preventing detrimental twisting of the anti-friction elements, such as does occur where rollers are used.

The foregoing and such other objects and advantages as may appear or be pointed out as this description proceeds, are attained in the embodiment illustrated in the accompanying drawing, in which:

Figure 1 is a transverse sectional view thru a bearing embodying this invention;

Figure 2 is a view in longitudinal section of the bearing shown in Figure 1;

Figure 3 is a view similar to Figure 2 showing a modified form of bearing.

Referring to the drawing, and more particularly to Figures 1 and 2, 5 is a bearing cone, said cone having an axial opening 6 to permit the fixed mounting of the cone on a shaft (not shown). The outer peripheral surface 7 of the cone 5 is disposed at an inclination to the axis of the cone, and said surface is provided with two spaced circumferential depressions 9 and 10, said depressions being of equal depth and conforming in cross-section to the arc of a circle, or, in other words, of such curvature that they form raceways and accurately seat the anti-friction elements, such as two spaced circumferential series of balls 11 and 12. The balls of each series are maintained in spaced relation by a circular ball carrying frame 13, which, as shown, serves to support and equally space the balls of both series, and also to retain the balls when removed from the cone. It will be seen that the frame 13 is of generally conical shape, so that the axes of the alined balls of each series are in the same general plane and that this plane, indicated by the line 14, is parallel with the plane in which the peripheral surface 7 of the cone 5 lies. Thus, the respective anti-friction units of each set all contact equally with the raceways 9 and 10. This arrangement provides two circumferential series of individual anti-friction elements in which the complemental elements of each series are arranged with their axes in the same longitudinal plane. It follows that these anti-friction elements cannot become unevenly worn, because the pressure is equally distributed on all of the elements, and it will also be observed that these elements take the place of rollers. Furthermore, the conical arrangement provides for end thrust as well as radial thrust. It is obvious that, even though there is a slight angular displacement of the cup and cone, the balls will always assume even contact on both the cup and cone, so that one of the principal objections to the use of rollers, namely, binding due to twisting, is eliminated, thus making the bearing self-alining.

Provision is made for installing the device illustrated in a universal joint, or where the bearing must be self-alining, and to this end the cup 18 is provided with a circumferential inner face 19, which is a portion of a spherical surface, the balls contacting directly therewith. However, as this surface 19 is described about a point 20, it will be obvious that the points of contact of the balls 11 and 12 with the surfaces 7 and 19 will be located on radial lines 21—21, passing through the centers of the balls. The axes of rotation of the individual balls, therefore, will be at right angles to the lines 21 which connect the contact of the balls and races with the center of the surface 19. At the same time, however, it will be seen that a line connecting corresponding balls of the two series will be parallel to the surface 7 of the cone 5, as indicated at 14 in Figure 2. Thus the even distribution of pressure is again afforded, giving to the bearing greater efficiency, and increased durability.

It will likewise be seen that the diametrical planes of both ball sets 11 and 12 lie on chords across the spherical curvature 19 of the cup member 18, and that both chords are to the same side of center 20 thereof.

The same principle is involved in the form of the invention shown in Figure 3 in which the disposition of the balls 11 and 12 with relation to the cone 5 and cup 18 is substantially identical to the embodiment hereinabove described. I provide, however, a ball carrying frame 13' comprising independent retainers 22 and 23 to guide the series of balls 11 and 12 respectively, the said ball retainers being slightly spaced from each other. By this arrangement, the retainers run independently of each other to accommodate for the slight difference of peripheral speeds attained by the balls of each series, and thus any friction that might occur between the balls of the series running at the greater peripheral speed and the contacting surfaces of a single ball cage or frame is eliminated.

In the device of this invention, as presented in either form, the load is equally distributed upon the two series of balls, and the bearing cannot operate to place all the load on one or the other of the series of balls because of the tapering of the cone and the curvature of the cup and because of the use of balls as distinguished from rollers. It will be seen that a minimum of slippage occurs between the anti-friction devices and the bearing surfaces, and as the balls of the two series are independent, there is no dragging or slipping of the anti-friction elements as would occur with rollers, even though the latter were tapered. Thus the different speeds at which the parts of a solid anti-friction element must move is taken care of by separate elements and these elements being spherical furthermore prevent friction due to different speeds. It is obvious that in this device the balls will all revolve at close to the same speed, and thus wear is evenly distributed. The bearing also takes up end thrust by the use of balls, due to the inclination of the bearing surfaces.

The present application is a continuation in part of an application filed by me under date of March 29, 1922, and bearing Serial Number 547,879, entitled "Ball bearings."

From the foregoing it will be seen that the efficiency of operation of the anti-friction bearing is increased, its cost is reduced, without sacrificing strength and durability, and while a specific structural arrangement has been shown, I reserve the right to modify the same within the limits prescribed by the claims.

I claim:

1. In a self-aligning ball bearing, the combination of an inner bearing member and an outer bearing member, said inner bearing member being of conical form and having two spaced annular grooves formed therein, a large diameter ball-set in one of said grooves, a small diameter ball-set in the other of said grooves, a ball carrying frame spacing both series of balls, and a spherical surface in said outer bearing member on which both of said ball-sets roll, each of said ball-sets having radial and thrust load carrying contact with said spherical surface, said spherical surface being struck from a center disposed outwardly of the diametrical plane of said large ball-set in the direction of the larger end of the inner conical bearing member and in the axis of rotation of the bearing whereby each of said ball-sets will maintain its combined radial and thrust load carrying characteristics when said bearing members are angularly displaced.

2. In a self-aligning ball bearing, the combination of a one-piece inner bearing member of conical form, a one piece outer bearing member, said inner bearing member having two spaced annular grooves formed therein, a large diameter ball-set in one groove, a small diameter ball-set in the other groove, and a spherical bearing surface in said one-piece outer bearing on which both of said ball-sets roll, said spherical bearing surface being inscribed from a center located laterally of the diametrical planes of the ball sets in the direction of the larger end of the inner bearing member, whereby each of said ball-sets will maintain its combined radial and thrust load carrying characteristics in different angular positions of said inner bearing member.

3. In a self-aligning ball bearing, the combination of an inner cone bearing member and an outer cup bearing member, said inner bearing member having two spaced annular grooves formed therein; a large diameter ball-set in one groove, a small diameter ball-set in the other groove, and a spherical bearing surface in said outer bearing member on which both of said ball sets roll, said spherical bearing surface being inscribed from a center disposed out of the diametrical plane of said large ball-set near the larger end of the inner cone member.

4. In a self-aligning ball bearing, the combination of an inner cone bearing member, an outer bearing member, one of said bearing members having two spaced annular grooves formed therein, the other of said bearing members having a spherical bearing surface throughout its depth, and two ball-sets of different diameters engaging in said grooves and rolling on said spherical bearing surface, a ball carrying frame spacing both series of balls, the diametrical planes of both ball-sets lying on chords across the spherical curvature of said bearing member, and both chords to the same side of the center, each of said ball-sets contacting with portions of said spherical bearing surface at points whereby each ball-set will carry radial and thrust loads, said large ball-set carrying the major portion of the radial load and said small ball-set carrying the major portion of the thrust load.

5. In a self-aligning ball bearing, the combination of an inner bearing member, an outer bearing member, a pair of spaced annular grooves in one of said bearing members, the other of said bearing members having a spherical bearing surface, and two separate ball sets in said grooves and rolling on said spherical surface, the diametrical planes of both ball-sets lying on chords across the spherical curvature of said bearing member, and both chords to the same side of the center.

In testimony whereof I affix my signature at 10 South LaSalle St., Chicago, Illinois.

BERNARD OKNER.